United States Patent [19]

McCafferty

[11] Patent Number: 5,372,478

[45] Date of Patent: Dec. 13, 1994

[54] HELICOPTER ROTOR DAMPER

[75] Inventor: Hugh A. McCafferty, Upper Darby, Pa.

[73] Assignee: The Boeing Company, Seattle, Wash.

[21] Appl. No.: 13,367

[22] Filed: Feb. 4, 1993

[51] Int. Cl.$^5$ .............................................. B64C 27/51
[52] U.S. Cl. ..................... 416/106; 416/107; 416/140
[58] Field of Search ............... 416/106, 107, 134 A, 416/140, 244 D

[56] References Cited

U.S. PATENT DOCUMENTS

| | | | |
|---|---|---|---|
| 1,925,071 | 8/1933 | Griswold | 74/6 |
| 1,925,072 | 8/1933 | Griswold | 74/6 |
| 3,842,945 | 10/1974 | Potter | 416/107 |
| 4,249,862 | 2/1981 | Waddington | 416/134 A |
| 4,297,078 | 10/1981 | Martin | 416/134 A |
| 4,504,193 | 3/1985 | Mouille | 416/140 |
| 4,575,358 | 3/1986 | Ferris | 464/90 |
| 4,580,945 | 4/1986 | Miller | 416/140 A |
| 4,588,356 | 5/1986 | Pariani | 416/140 |
| 5,007,799 | 4/1991 | Mouille et al. | 416/107 |

Primary Examiner—Edward K. Look
Assistant Examiner—Mark Sgantzos
Attorney, Agent, or Firm—Jones, Tullar & Cooper

[57] ABSTRACT

A hollow rotor hub is provided at the top of the rotor shaft for a multi-bladed helicopter. The blades being mounted to the rotor hub on spherical elastomeric bearings which provide for coincident rotor blade hinges for blade pitch, flap and lead-lag motions. The invention discloses a lead-lag damper contained in a housing at the center of the hollow rotor hub. The damper consists of a series of damping plates, each plate being connected to one of the rotor blades. The damping plates are separated from each other and from the damper housing by elastomeric layers bonded to the plates and to the housing. Lead-lag damping is provided by the shear in the elastomeric layers. The damper may be fastened to the air frame in a conventional manner, it may be mounted on a spindle for rotation about the rotor axis independent of rotor shaft rotation or may be free-floating and attached only to the rotor blades and not to the rotor shaft. With suitable selection of elastomeric damping material properties, it can provide blade to hub damping, blade to blade damping or combinations thereof.

12 Claims, 7 Drawing Sheets

HELICOPTER ROTOR DAMPER

BACKGROUND OF THE INVENTION

This invention relates in general to dampers for articulated helicopter rotors and in particular to a unique damper for lead lag motion of the blades.

In modern helicopters, the rotor blades are articulated to provide motion for blade pitch, flap and lead lag motion. Dampers are required in this lead lag motion in order to prevent air and/or ground resonance problems. The conventional means for providing this damping is to attach a hydraulic or elastomeric damper between each blade root end and the hub rotor hub of the helicopter. In a four-bladed helicopter rotor for example this would require four separate dampers and their accompanying attachment mechanisms to provide lead-lag damping. These dampers and their attachment hardware add substantially to the maintenance costs and weight of the helicopter and generally increase the rotor head height which is also an undesirable characteristic since rotor height contributes substantially to the aircraft's aerodynamic drag In conventional articulated helicopters, a separate hinge is provided for each of the three motions of the blade. Thus a four bladed helicopter would require twelve separate hinges as well as the four individual lead lag dampers. One method of reducing complications in the rotor hub is to provide a spherical elastomeric bearings for attaching the blade to the rotor head. Such bearings eliminate the individual hinges by providing a spherical rotating member which provides coincident hinge points for all three blade motions. However, lead lag damping is still required and previously has been conventionally provided by individual hydraulic or elastomeric dampers.

The present invention provides a helicopter hub utilizing spherical elastomeric bearings to support the blades and providing coincident hinges and additionally, providing a single lead lag damper assembly within the hollow hub of the rotor head which provides elastomeric lead-lag damping for all blades simultaneously and can be configured for either blade-to-ground damping or blade-to- blade damping or combinations thereof as required.

SUMMARY OF THE INVENTION

This invention provides a lead lag damping assembly in the hollow center of the rotor hub which can be configured for blade-to- blade damping, blade-to-ground damping or combinations thereof.

The invention provides a series of metallic plates stacked one on top the other and separated by elastomeric layers bonded to each plate and between certain plates and the housing. A plate is attached to each rotor blade and damping is provided by shear of the elastomeric material between the plates. In its basic configuration, the plates are each a hollow round disc with one disc provided for each blade. However, in order to reduce the size and weight of the assembly the plates may be approximately semicircular plates or quarter circular plates depending on the lead-lag motion and damping requirement of the individual helicopter.

DETAILED DESCRIPTION OF THE PREFERRED EMBODIMENT

Figure 1:
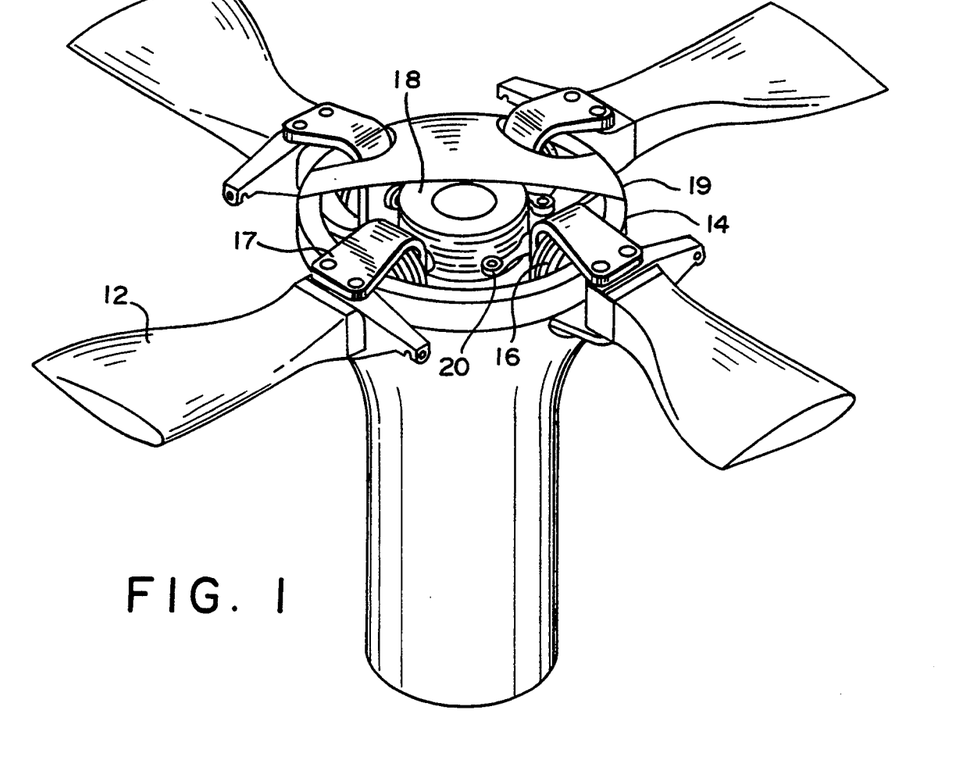
FIG. 1 is an isometric overall view of a helicopter rotor utilizing the invention.

Referring now to FIG. 1, there is shown a rotor shaft and hub for a four bladed helicopter rotor utilizing the invention. The shaft 10 is attached to the power source of the helicopter (not shown) for rotation of the blade 12. In this illustration, a four bladed helicopter is described. The blades are attached to the hub 14 by means of the pitch housing 17 and the spherical elastomeric bearings 16. In the center of the hollow hub is a damper assembly 18. The pitch housing of each blade is connected to the damper assembly by means of a short link 20. The cover 19 is shown partially removed in order to expose the internal members. Blade pitch is controlled through the pitch arm 13.

Figure 2A:
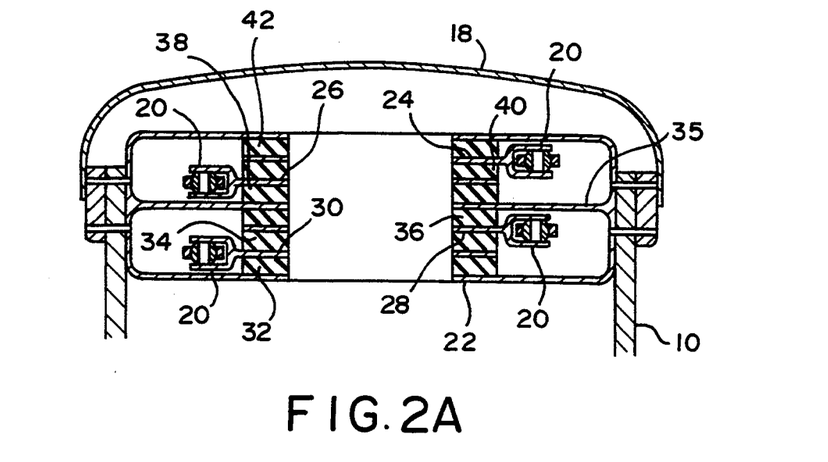
FIG. 2A is a sectional elevation view taken through the damper portion of the assembly of FIG. 1.

Referring now to FIG. 2A, there is shown a cross sectional view of the damper 18 of FIG. 1. The damper is comprised of a housing 22 which is attached to the shaft 10. Within the housing, there is a series of circular plates designated 24, 26, 28, and 30. Each plate is attached to a pitch housing 17 (shown in FIG. 1) of one of the rotor blades 12 by means of the short 20. Between each of the plates there is provided a layer of elastomeric material bonded to the plates. In the illustration shown, the elastomeric layer 32 having high damping properties is bonded to plate 30 and to the housing 22. An elastomeric layer 34 having minimal damping properties is bonded to plates 30 and 28, elastomeric layer 36 with high damping properties is bonded between plate 28 and the central web of the housing 22. An elastomeric 38 with high damping properties is bonded to the central web 35 of housing 22 and plate 26. An elastomeric layer 40 with minimal damping properties is bonded to plates 24 and 26. An elastomeric layer 42 with high damping properties is bonded between plate 24 and the upper surface of the housing 22.

As can be seen from this cross sectional view, each of the blades is damped in the lead lag direction by the shearing of the elastomeric material provided between the plates and between the plates and the housing. Thus, all lead lag damping is accomplished by the elastomeric layers within a single assembly in the hollow hub of the rotor.

Figure 2B:
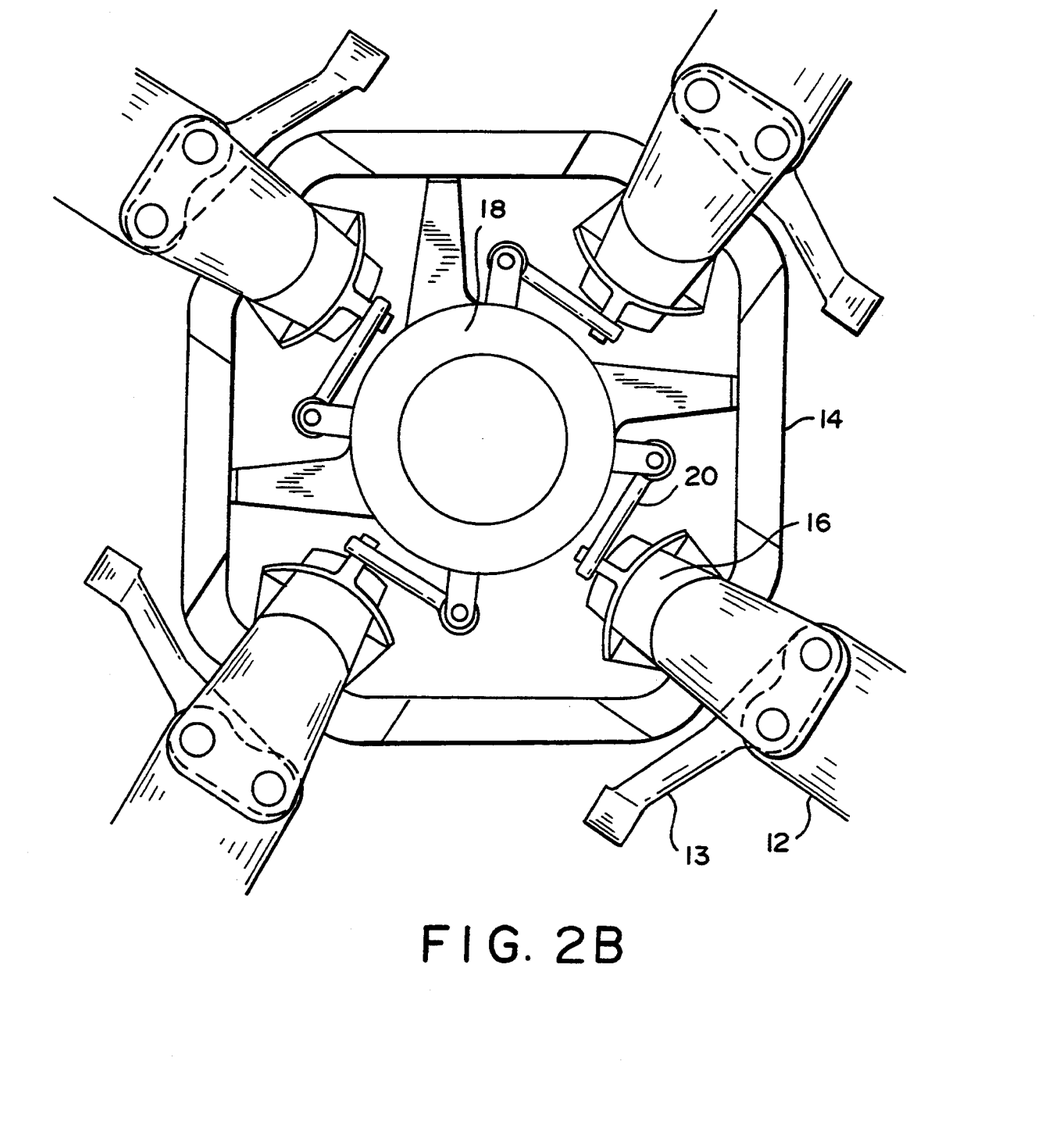
FIG. 2B is a plan view of the damper of FIG. 2A.

FIG. 2B is a plan view of the damper of FIG. 2A and clearly shows the damper housing 18 attached to the rotor hub 14. The housing is open on one side for insertion of the plates and elastomer. Each of the blades 12 is supported by a spherical elastomeric bearing 16. The pitch housing 17 of each blade is attached to the damper 18 by means of a short link 20. Blade pitch is accomplished in the conventional manner through means of pitch arm 13 attached to each of the blades.

Figure 3A:
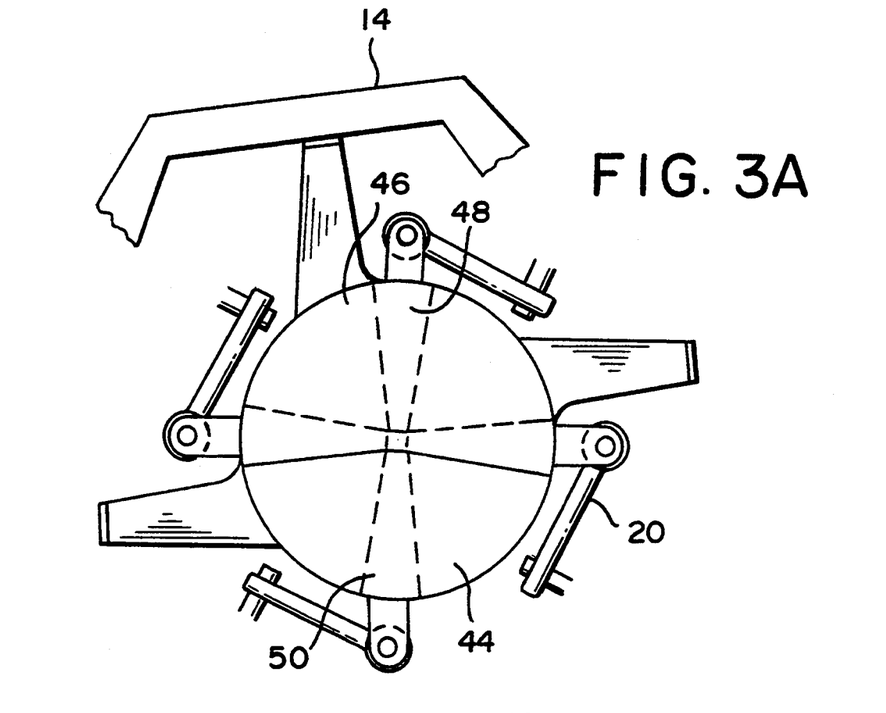
FIG. 3A is a plan view of the damper of FIG. 1 using semicircular plates.
Figure 3B:
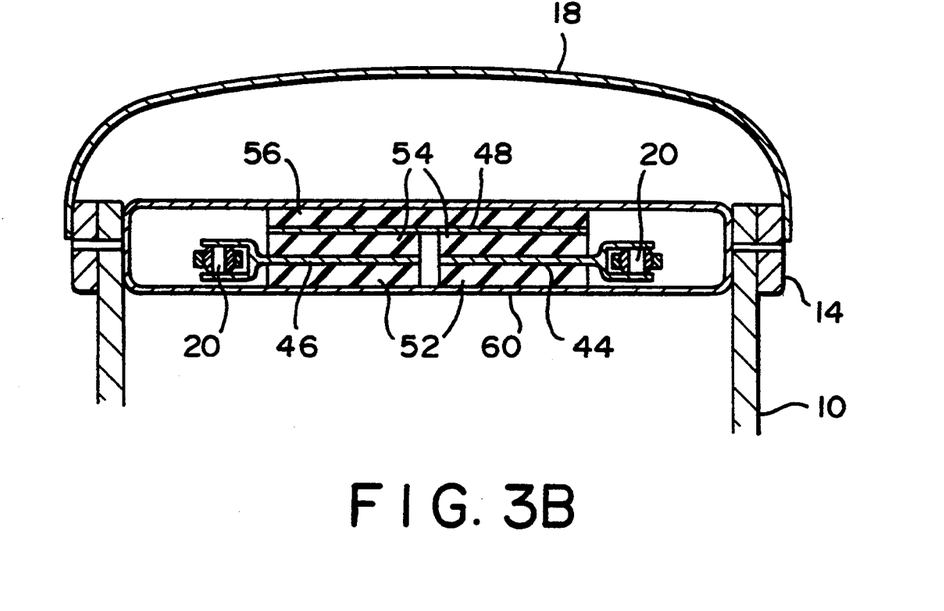
FIG. 3B is a sectional elevation view of the damper of FIG. 3A.

In any aircraft configuration it is desirable to reduce the frontal area of the aircraft in order to reduce aerodynamic drag in flight. One major source of drag for helicopters is the height of the rotor hub. Referring now to FIGS. 3A and 3B there is shown an embodiment of the invention which allows the hub to be reduced in height substantially thus reducing the frontal area creating aerodynamic drag.

In order to accomplish this reduction in height, each of the individual plates described in connection with FIGS. 2A and 2B above are formed as approximately semicircular plates rather than full hollow circular plates. Thus, there are only two levels of plates rather than four as shown in FIG. 2. Lower pair of plates is shown in FIG. 3B as elements 44 and 46. The upper two semicircular plates are designated 48, 50. In FIG. 3B only plates 44, 46 and 48 show in the sectional view. Again, each of the plates is separated from the other plates and the housing by an elastomeric layer having suitable damping properties bonded at the top and bottom to the metallic structure. Thus, in FIG. 3B the elastomeric barrier 52 is bonded to the lower internal surface of housing 60 and to the bottom surface of plates 46 and 44. An elastomeric layer 54 is bonded to the upper surface of plates 46 and 44 and the lower surface of plates 48 and 50. An elastomeric layer 56 is bonded to the upper surface of plates 48 and 50 and to the upper internal surface of the housing 60. Thus, by utilizing semicircular plates the number of layers in the damper can be reduced from four to two.

Figure 4A:
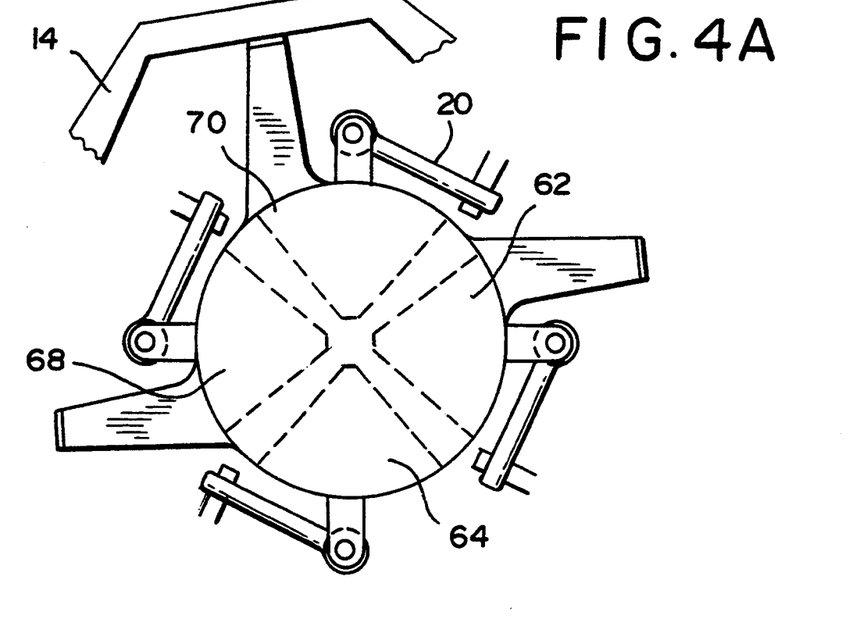
FIG. 4A is a plan view of the damper assembly of FIG. 1 utilizing quarter plate dampers.
Figure 4B:
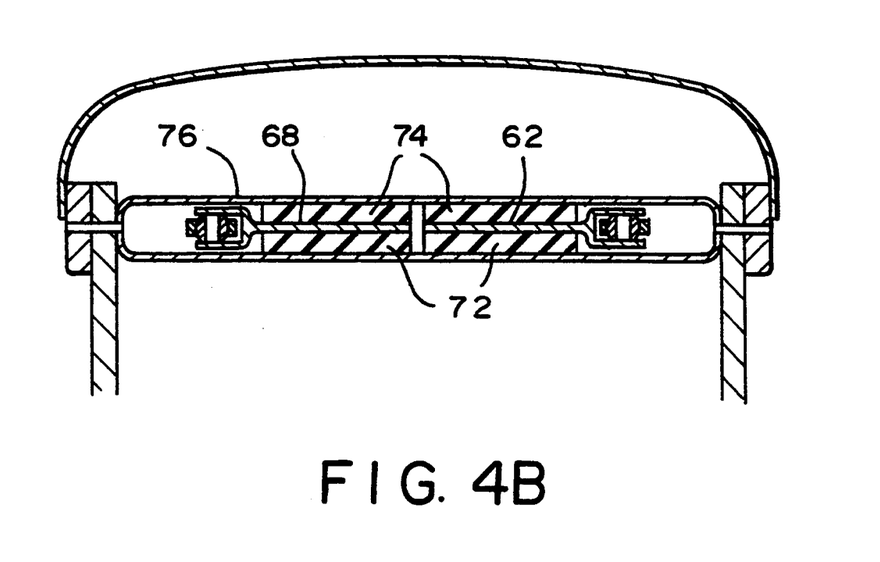
FIG. 4B is a sectional elevation view of the damper of FIG. 4A.

Referring now to FIGS. 4A and 4B, this embodiment illustrates how the damper housing may be further reduced in height by using quarter circle plates attached to each rotor blade. In FIG. 4A each of the plates is shown in the plan view and are designated 62, 64, 68 and 70. Each plate is attached by means of short link 20 to an individual rotor blade not shown in this view. In the sectional view shown in FIG. 4B, the plates 62 and 68 are shown and are bonded to elastomeric layers 72 and 74 which are in turn bonded to their respective sides of the housing 76. Here, the further reduction in rotor hub height is illustrated by the fact that only a single layer of damping plates and two layers of elastomeric are required to provide lead lag damping for all four rotor blades.

Figure 5:
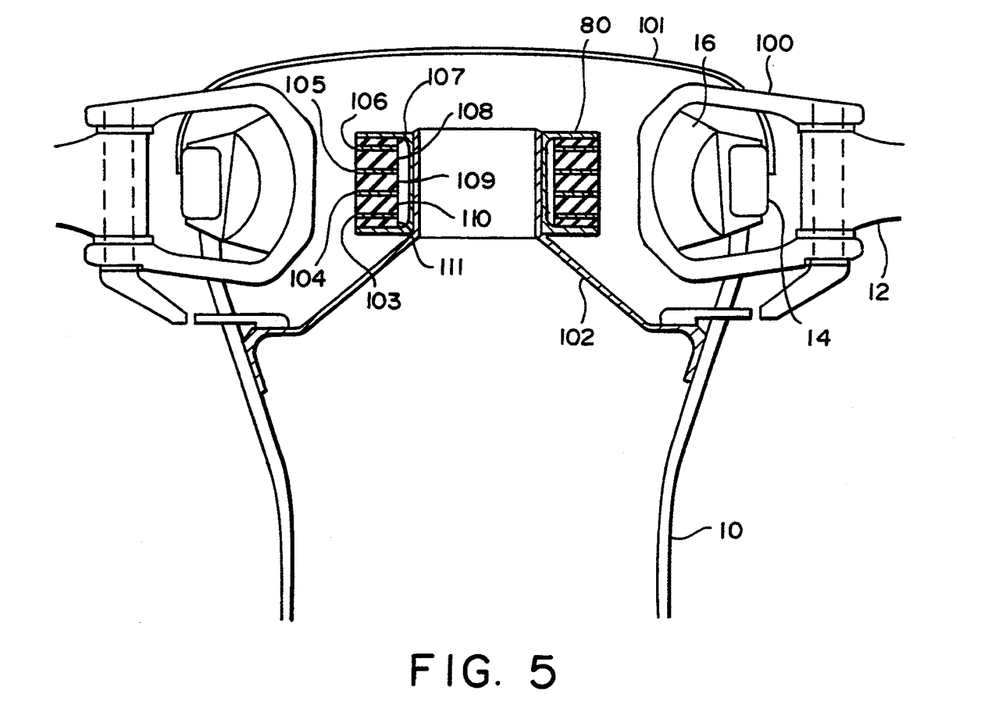
FIG. 5 is a sectional elevation view through the hub of FIG. 1 illustrating a blade to blade damper guided on a spindle.

Referring now to FIG. 5, another embodiment of the invention is described in which the damper housing is not grounded to the airframe as was the case in the embodiments previously described. Referring now to FIG. 5, the sectional elevation view of the embodiment shows the rotor shaft 10 supporting four rotor blades 12 each supported in turn in the hub 14 by a pitch housing 17 and an elastomeric spherical bearing 16. Here, the damper housing 80 is not grounded to the airframe but is free to turn on spindle 102. The short links 82, not shown here attach each plate 103, 104, 105 and 106 to the root of each rotor blade. Between each of the plates there is bonded a layer of elastomeric material. In the installation shown, the elastomeric layer 111 is bonded to plate 103 and housing 80. An elastomer layer 110 is bonded to plates 103 and 104; elastomeric layer 109 to plates 104 and 105; elastomeric layer 108 to plates 105 and 106; elastomeric layer 107 to plate 106 and housing 80. The top and bottom of housing 80 are joined after the bonding is accomplished.

Figure 6:
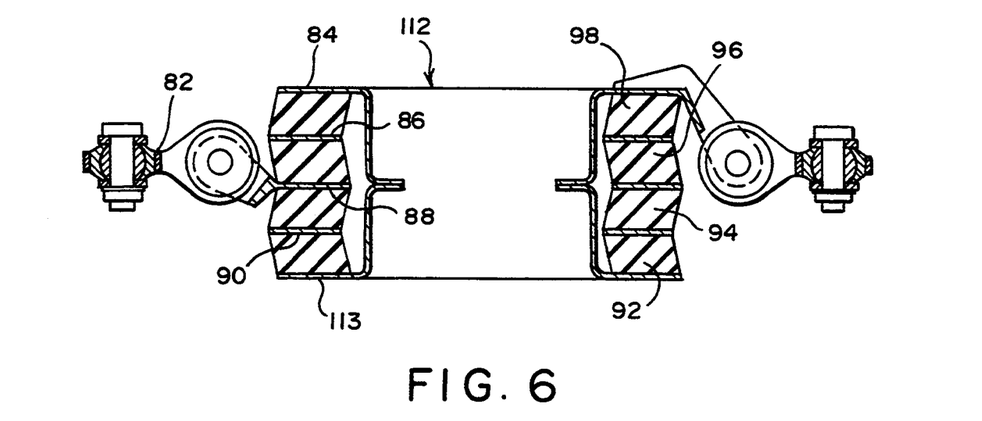
FIG. 6 is a sectional view of the damper of FIG. 5 configured for a floating damper configuration.

Referring now to FIG. 6, there is shown a sectional drawing of the floating damper assembly 112. In this embodiment, each of the short links 82 is connected to the pitch housing of its respective rotor blade and to a metal plate in the form of a circular ring in the damper assembly. The upper and lower surfaces of the assembly are formed by rings 84 and 113 which form the top and bottom surfaces of the assembly. Rings 86, 88 and 90 are each attached through short links to the pitch housings of their respective rotor blades. The rings are separated by four layers of elastomeric material bonded to the metallic surfaces of the rings it touches on both sides. These elastomeric layers are shown at 92, which are bonded to the lower internal surface of housing ring 113 and to the lower surface of ring 90. An elastomeric layer 94 is bonded to the upper surface of ring 90 and the lower surface of ring 88. An elastomeric layer 96 is bonded to the upper surface of ring 88 and the lower surface of ring 86. An elastomeric layer 98 completes the assembly by being bonded to the upper surface of ring 86 and to the lower internal surface of the housing ring 84. The top 84 and the bottom 113 are joined to form the assembly 112 after bonding. Thus, in this embodiment also, complete lead-lag damping is achieved for all blades with a single damping assembly. Because of the spring property of the elastomer in the damper, the short links 82 are always in tension which provides a three fold advantage. This design eliminates the need for the complexity and weight of support structure and provides the freedom of the damper assembly to wobble which nearly eliminates the coupling of pitch and flap motions with the damper. In addition, since the short links are always in tension the vibratory loads are not reversed in sign during operation. This substantially contributes to the life and reliability of the rotor hub assembly by reducing the fatigue stress usually imposed on rotating parts of helicopter hubs.

Figure 7:
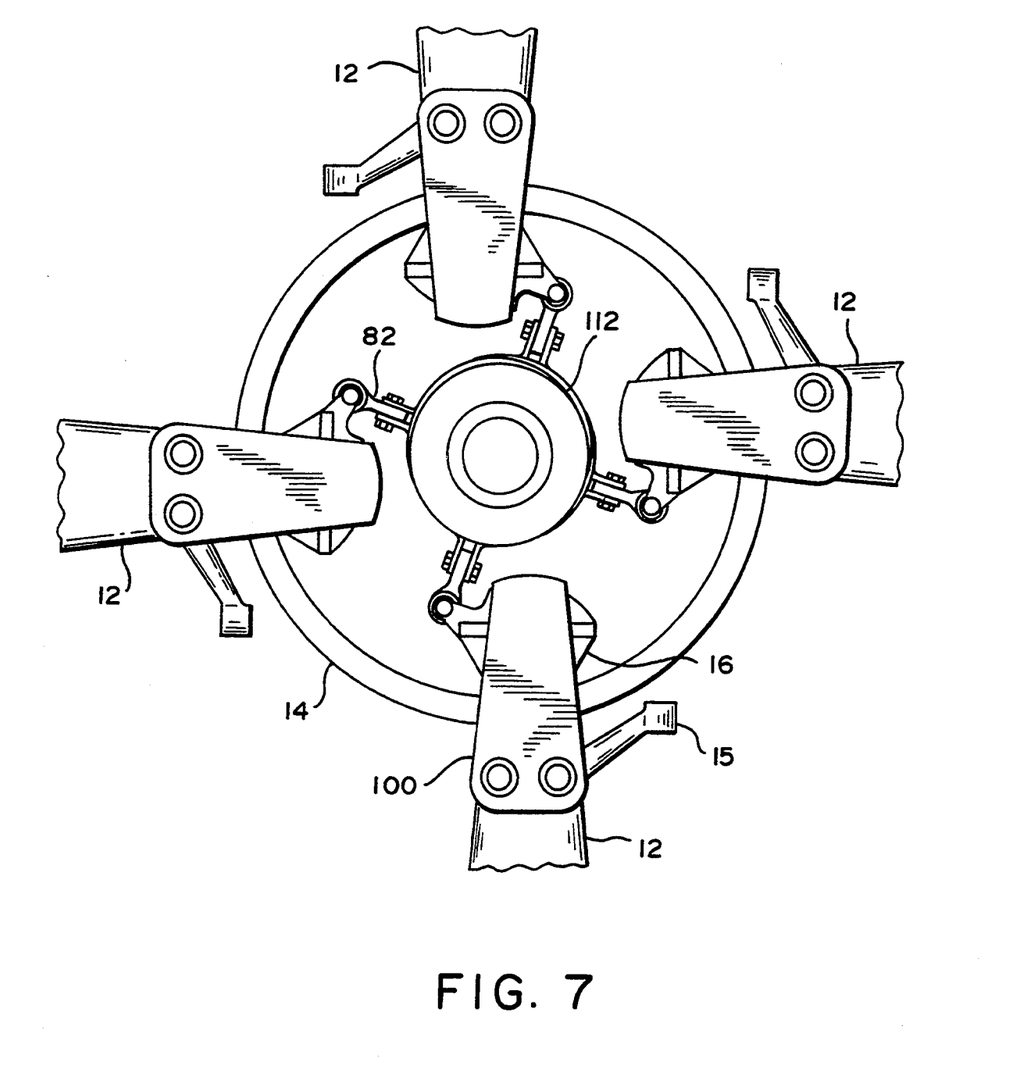
FIG. 7 is a plan view of the hub of the damper of FIG. 6.

Thus can be seen in this invention there is provided a unitary assembly housed within the hollow rotor hub which provides complete lead-lag damping for all blades of the rotor. In addition, the assembly may be made with a low profile to substantially reduce the height of the rotor head. In addition, the elimination of multiple dampers and hinges substantially increases the overall reliability of the helicopter rotor which is subjected to substantial vibratory loads in flight. FIG. 7 is a plan view of the embodiment of FIG. 6.

Figure 8:
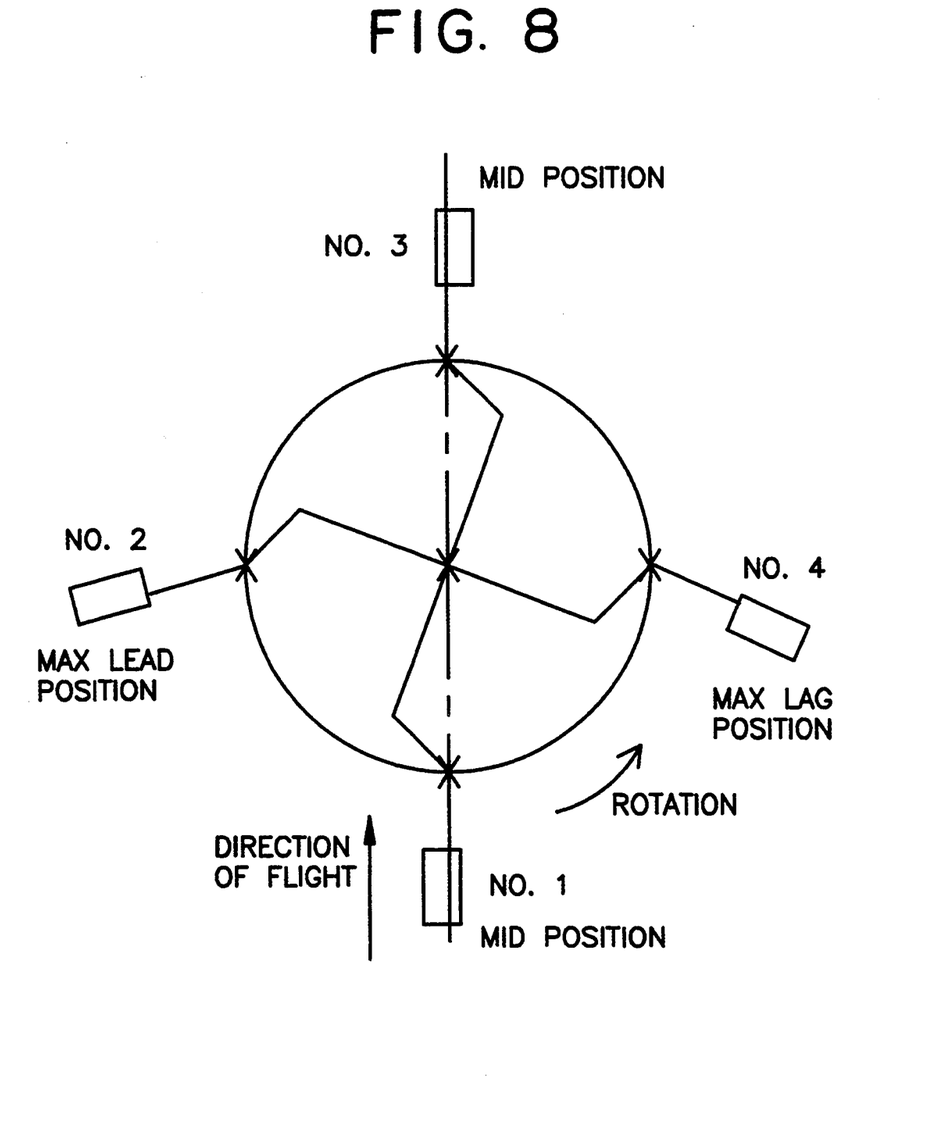
FIG. 8 is a schematic representation of the motions of the invention during flight.

Referring now to FIG. 8, there is shown a schematic diagram of the rotor utilizing the invention at a particular position in relation to the direction of flight. In this figure, the blades have been numbered 1, 2, 3 and 4 in a clockwise manner around the rotor axis. The sectional view in FIG. 6 illustrates the position of the discs under the condition illustrated in FIG. 8. As can be seen, in this position discs 86 and 90 are displaced to the left relative to discs 84, 113 and 88. The displacement of discs 86 and 90 is accompanied by a rotation of discs 84, 113 and 88 about the rotor shaft axis since they are not constrained. The translation of discs 86 and 90 produces a radial force and the rotation of discs 84, 113 and 88 produces a tangential force due to the spring rate of the elastomers. The damper assembly is free to float to a position where the vector sum of the radial and tangential forces from each plate is directed along the center line of the short link 82 that is attached to it. The force in the short link produces the damping moment about the lag hinge of the elastomeric hinge 16. When the blade pitch is changed in cyclic pitch, the damper will tilt. If all of the blades are changed in pitch by the collective control the damper assembly will be raised or lowered. When the assembly is installed all of the blades are moved to their full lag position before the short link is attached to the blade. This assures that the short link will always be in tension do to the preload on the elastomeric layers in the assembly.

Thus it can be seen that this invention provides a single unit, mechanically simple lead-lag damper for all the blades of a helicopter rotor which can be installed in a hollow rotor shaft and will provide a smaller frontal area thus insuring less aerodynamic drag. The damper may be grounded to the airframe in a conventional manner guided on a spindle or assembled as a free floating damper for blade-to-blade damping.

What is claimed is:

1. A rotor hub for a helicopter rotor rotatable about a rotor axis, said hub comprising;
    a rotor shaft having a central opening at its upper end and extending at least partially through its length along the rotor axis;
    a plurality of rotor blades attached to said rotor shaft and rotatable therewith about the rotor axis;
    spherical bearing means for attaching said rotor blades to said rotor shaft, said spherical bearings providing for motion of said blades in blade pitch, flap and lead-lag directions, the hinge points of said motions being coincident in the spherical bearing;
    a damper assembly assembled in the central opening of said rotor shaft for providing damping in the lead-lag direction, said damper comprising;
    a damper housing assembled in said rotor shaft and centered on the rotor axis said housing being a hollow structure having upper and lower walls;
    a plurality of damper plates mounted in said damper housing, one plate being provided for each of said rotor blades;
    elastomeric material assembled between said plates and between said plates and the damper housing;
    means for attaching each of said blades to a separate one of said damper plates.

2. A rotor hub according to claim 1 wherein said damper plates are circular plates having their center coincident with said rotor axis, said damper plates being stacked one on top of the other in concentric layers, said elastomeric material between said plates being bonded to its adjacent plates and an elastomeric layer being bonded to the top surface of the top damper plate and to the inside surface of the upper wall of said housing and an elastomeric layer bonded to the bottom surface of the lowest damper plate and the inner surface of the lower wall of said housing.

3. A rotor hub according to claim 1 wherein said damper plates are approximately semi-circular plates having their circle center coincident with said rotor axis, said damper plates being stacked one on top of the other in concentric layers, each layer containing two damper plates forming a circular structure, said elastomeric material between said plates being bonded to its adjacent plates and an elastomeric layer being bonded to the top surface of the top damper plate and to the inside surface of the upper wall of said housing and an elastomeric layer bonded to the bottom surface of the lowest damper plate and the inner surface of the lower wall of said housing.

4. A rotor hub according to claim 1 wherein said damper plates are approximately quarter circle plates having their circle center coincident with said rotor axis, said damper plates being assembled in a single layer containing four damper plates forming a circular structure, said elastomeric material between said plates being bonded to its adjacent plates and an elastomeric layer being bonded to the top surface of the damper plates and to the inside surface of the upper wall of said housing and an elastomeric layer bonded to the bottom surface of the damper plates and the inner surface of the lower wall of said housing.

5. A rotor hub for a helicopter rotor according to claim and further comprising means for attaching said damper housing to said rotor shaft for rotation therewith.

6. A rotor hub according to claim 5 wherein said damper plates are circular plates having their center coincident with said rotor axis, said damper plates being stacked one on top of the other in concentric layers, said elastomeric material between said plates being bonded to its adjacent plates and an elastomeric layer being bonded to the top surface of the top damper plate and to the inside surface of the upper wall of said housing and an elastomeric layer bonded to the bottom surface of the lowest damper plate and the inner surface of the lower wall of said housing.

7. A rotor hub according to claim 5 wherein said damper plates are approximately semi-circular plates having their circle center coincident with said rotor axis, said damper plates being stacked one on top of the other in concentric layers, each layer containing two damper plates forming a circular structure, said elastomeric material between said plates being bonded to its adjacent plates and an elastomeric layer being bonded to the top surface of the top damper plate and to the inside surface of the upper wall of said housing and an elastomeric layer bonded to the bottom surface of the lowest damper plate and the inner surface of the lower wall of said housing.

8. A rotor hub according to claim 5 wherein said damper plates are approximately quarter circle plates having their circle center coincident with said rotor axis, said damper plates being assembled in a single layer containing four damper plates forming a circular structure, said elastomeric material between said plates being bonded to its adjacent plates and an elastomeric layer being bonded to the top surface of the damper plates and to the inside surface of the upper wall of said housing and an elastomeric layer bonded to the bottom surface of the damper plates and the inner surface of the lower wall of said housing.

9. A rotor hub for a helicopter rotor rotatable about a rotor axis, said hub comprising;
    a rotor shaft having a central opening at its upper end and extending at least partially through its length along the rotor axis;
    a plurality of rotor blades attached to said rotor shaft and rotatable therewith about the rotor axis;
    spherical bearing means for attaching said rotor blades to said rotor shaft, said spherical bearings providing for motion of said blades in blade pitch, flap and lead-lag directions, the hinge points of said motions being coincident in the spherical bearing;
    a damper assembly assembled in the central opening of said rotor shaft for providing damping in the lead-lag direction, said damper comprising;

a damper housing assembled in said rotor shaft and centered on the rotor axis said housing being a hollow structure having upper and lower walls;

a plurality of damper plates mounted in said damper housing, one plate being provided for each of said rotor blades;

elastomeric material assembled between said plates and between said plates and the damper housing;

means for attaching each of said blades to one of said damper plates;

a spindle attached to said rotor shaft for rotation therewith; and means for mounting said damper housing on said spindle for rotation on said spindle about the rotor axis independent of the rotation of said rotor shaft.

10. A rotor hub according to claim 9 wherein said damper plates are circular plates having their center coincident with said rotor axis, said damper plates being stacked one on top of the other in concentric layers, said elastomeric material between said plates being bonded to its adjacent plates and an elastomeric layer being bonded to the top surface of the top damper plate and to the inside surface of the upper wall of said housing and an elastomeric layer bonded to the bottom surface of the lowest damper plate and the inner surface of the lower wall of said housing.

11. A rotor hub according to claim 9 wherein said damper plates are approximately semi-circular plates having their circle center coincident with said rotor axis, said damper plates being stacked one on top of the other in concentric layers, each layer containing two damper plates forming a circular structure, said elastomeric material between said plates being bonded to its adjacent plates and an elastomeric layer being bonded to the top surface of the top damper plate and to the inside surface of the upper wall of said housing and an elastomeric layer bonded to the bottom surface of the lowest damper plate and the inner surface of the lower wall of said housing.

12. A rotor hub according to claim 9 wherein said damper plates are approximately quarter circle plates having their circle center coincident with said rotor axis, said damper plates being assembled in a single layer containing four damper plates forming a circular structure, said elastomeric material between said plates being bonded to its adjacent plates and an elastomeric layer being bonded to the top surface of the damper plates and to the inside surface of the upper wall of said housing and an elastomeric layer bonded to the bottom surface of the damper plates and the inner surface of the lower wall of said housing.

* * * * *